United States Patent
Seike et al.

(10) Patent No.: US 6,844,397 B2
(45) Date of Patent: Jan. 18, 2005

(54) POWDER COATING OF EPOXY GROUP-CONTAINING VINYL COPOLYMERS WITH DIFFERENT TG'S AND POLYCARBOXYLIC ACID

(75) Inventors: Naoyuki Seike, Osaka (JP); Koichi Yamaguchi, Osaka (JP); Katsuhiko Okada, Osaka (JP); Tetsuro Agawa, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 33 days.

(21) Appl. No.: 10/142,879

(22) Filed: May 13, 2002

(65) Prior Publication Data

US 2003/0211326 A1 Nov. 13, 2003

(51) Int. Cl.[7] .......................... B32B 15/08; B32B 27/30; C08L 33/14
(52) U.S. Cl. .......................... 525/208; 428/461; 428/515
(58) Field of Search .......................... 525/208; 428/461, 428/515

(56) References Cited

U.S. PATENT DOCUMENTS 4,246,368 A * 1/1981 Murase ....................... 525/117
5,948,866 A * 9/1999 Takeda et al. ............... 525/194
6,506,820 B2 * 1/2003 Satoh et al. ................. 523/340

FOREIGN PATENT DOCUMENTS

| EP | 0 544 206 A2 | 6/1993 |
| EP | 652265 A1 * | 5/1995 |
| JP | 52-69936 | 6/1977 |
| JP | 2000-34424 A1 * | 2/2000 |
| JP | 2001-26738 A1 * | 1/2001 |

* cited by examiner

*Primary Examiner*—Robert Sellers
(74) *Attorney, Agent, or Firm*—Armstrong, Kratz, Quintos, Hanson & Brooks, LLP

(57) ABSTRACT

The present invention provides a powder coating composition, which can ensure excellent smoothness, scratch resistance, water resistance and humidity resistance, when formed into a thin film, and a coating film forming method. The powder coating composition contains an epoxy group-containing vinyl copolymer (A) having a glass transition temperature of 40° C. or higher and a number-average molecular weight of 1,000 to 2,500, an epoxy group-containing vinyl copolymer (B) having a glass transition temperature of 0° C. or lower, and a polycarboxylic acid (C). 30 to 90% by weight of a polymerization unit of the epoxy group-containing vinyl copolymer (B) originates in a methacrylic acid alkyl ester (b-1) which has an alkyl group having 8 or more carbon atoms.

5 Claims, No Drawings

POWDER COATING OF EPOXY GROUP-CONTAINING VINYL COPOLYMERS WITH DIFFERENT TG'S AND POLYCARBOXYLIC ACID

BACKGROUND OF THE INVENTION

1. Field of the Invention

The present invention relates to a novel and useful powder coating composition.

More particularly, the present invention relates to a powder coating composition, which can ensure excellent smoothness, scratch resistance, water resistance and humidity resistance, even when formed into a thin film having a thickness smaller than that employed conventionally in various purposes.

2. Description of Related Art

Powder coating compositions have widely been used as an environmentally friendly coating composition, which does not have an organic solvent to evaporate into the air during coating, in the entirety of the metal coating field. Among these powder coating compositions, a powder coating composition comprising an epoxy group-containing vinyl copolymer as a resin component and a polycarboxylic acid compound as a curing agent component is widely used, because it can form a coating film having excellent weather resistance, and is disclosed, for example, in Japanese Patent Application, First Publication No. 52-69936. However, powder coating compositions including one described in the publication were generally unsatisfactory in finishing appearance of the coating film as compared with a solvent-based coating.

Powder coating compositions for use as a next generation automobile top clear coating composition have recently been researched, intensively, and the demand for the finishing appearance of the coating film has increased more than before and the scratch resistance has been required as a new required performance.

To meet these demands, a powder coating composition having excellent finishing appearance and scratch resistance, and a coating method therefor are disclosed (U.S. Pat. No. 5,948,866). When using such a powder coating composition, a coating film has excellent finishing appearance and scratch resistance. Therefore, the feature of the powder coating composition increases the probability that it can be used as an automobile top clear coating composition, although the powder coating composition has hardly been used heretofore because of its poor finishing appearance and scratch resistance.

The powder coating composition is an environmentally friendly coating composition which can substantially eliminate organic solvent discharge to the air during coating. If the powder coating composition is exclusively used as the automobile top clear coating composition having a huge market, it becomes possible to markedly reduce burden on the global environment. From such a point of view, the powder coating composition has already started to partially replace conventional solvent-based coating compositions.

However, since excellent finishing appearance and scratch resistance of the coating film are required in this purpose, a conventional powder coating composition must be formed into a thick film at present in order to ensure the same performances as those of the solvent-based coating composition. Therefore, when a conventional powder coating composition is formed into a thin film, satisfactory performances cannot be achieved because of poor finishing appearance. If required performances can be achieved by forming the conventional powder coating composition into a thin film, it becomes possible to drastically reduce the total cost accompanying the amount of the powder coating composition, energy consumption and coating. Therefore, the demand of the market for conversion into a thin film has drastically increased.

Furthermore, the demand for coating film performances other than the finishing appearance and scratch resistance has increased more and more, thus causing a problem in that a powder coating composition is unsatisfactory in long-term water resistance and humidity resistance of the coating film under severe conditions. Therefore, a powder coating composition, which meets various properties, has never been obtained at present.

BRIEF SUMMARY OF THE INVENTION

An object to be achieved by the present invention is to provide a powder coating composition, which can ensure excellent smoothness, scratch resistance, water resistance and humidity resistance, even when formed into a thin film having a thickness smaller than that employed conventionally for various purposes.

In other words, an object of the present invention is to provide a powder coating composition, which can be formed into a thinner film as compared with the case of using a conventional powder coating composition, when forming a coating film having excellent smoothness, scratch resistance, water resistance and humidity resistance, and a coating film forming method.

An object of the present invention is to obtain a powder coating composition, which can ensure original excellent smoothness and scratch resistance as well as excellent water resistance and humidity resistance, even if the thickness of a coating film made of a powder coating composition is reduced to 60 μm or less or 50 μm or less, in the case in which the thickness has conventionally been controlled within a range from 60 to 80 μm in a certain coating filed.

To achieve the objects described above, the present inventors have intensively researched and have found that a coating film, which is formed of a powder coating composition comprising, as an essential film forming component, an epoxy group-containing vinyl copolymer (A) having a glass transition temperature of 40° C. or higher and a number-average molecular weight of 1,000 to 2,500, an epoxy group-containing vinyl copolymer (B) having a glass transition temperature of 0° C. or less obtained by copolymerizing epoxy group-containing vinyl monomers containing 30 to 90% by weight of a methacrylic acid alkyl ester (b-1) which has an alkyl group having 8 or more carbon atoms, and a polycarboxylic acid (C), is superior in smoothness and scratch resistance and is also superior in water resistance and humidity resistance. Thus, the present invention has been completed.

The present invention provides a powder coating composition comprising an epoxy group-containing vinyl copolymer (A) having a glass transition temperature of 40° C. or higher and a number-average molecular weight of 1,000 to 2,500, an epoxy group-containing vinyl copolymer (B), and a polycarboxylic acid (C), wherein 30 to 90% by weight of a polymerization unit constituting the epoxy group-containing vinyl copolymer (B) originates in a methacrylic acid alkyl ester (b-1) which has an alkyl group having 8 or more carbon atoms.

The present invention also provides a coating film forming method, which comprises using the powder coating composition described above as a topcoat coating composition when a single- or multi-layered coating film is formed on an article to be coated.

The present invention also provides a coated article obtained by applying the powder coating composition described above, as a topcoat coating composition (II), on a coating film formed on an article to be coated using a base coat coating composition (I) and curing the powder coating composition.

According to the powder coating composition and the coating film forming method of the present invention, it is made possible to obtain a coating film which is superior in water resistance and also superior in smoothness, coating film gloss and scratch resistance when formed into a thin film.

DETAILED DESCRIPTION OF THE INVENTION

Embodiments of the present invention will be described in detail below.

First, the epoxy group-containing vinyl copolymer (A) having a glass transition temperature of 40° C. or higher and a number-average molecular weight of 1,000 to 2,500 used in the present invention will be described.

The epoxy group-containing vinyl copolymer (A) having a glass transition temperature of 40° C. or higher and a number-average molecular weight of 1,000 to 2,500 refers to a vinyl copolymer, which has two or more epoxy groups on average in a molecule and also has a glass transition temperature of 40° C. or higher and a number-average molecular weight (of a tetrahydrofuran-soluble component as measured by gel permeation chromatography) of 1,000 to 2,500.

Although publicly known and conventional methods can be used to prepare the epoxy group-containing vinyl copolymer (A), the method of polymerizing using an epoxy group-containing vinyl monomer and, if necessary, other vinyl monomers copolymerizable with the monomer and reacting these monomers in an organic solvent is recommended because it is most simple. In that case, publicly known and conventional polymerization initiators and solvents can be used.

Examples of the epoxy group-containing vinyl monomer used in the preparation of the epoxy group-containing vinyl copolymer (A) include various epoxy group-containing monomers such as glycidyl (meth)acrylate, β-methylglycidyl (meth)acrylate, glycidyl vinyl ether, and allyl glycidyl ether; (2-oxo-1,3-oxolane) group-containing vinyl monomers such as (2-oxo-1,3-oxolane)methyl (meth) acrylate; and various alicyclic epoxy group-containing vinyl monomers such as 3,4-epoxycyclohexyl (meth)acrylate, 3,4-epoxycyclohexylmethyl (meth)acrylate, and 3,4-epoxycyclohexylethyl (meth)acrylate.

As the other vinyl monomer copolymerizable with the epoxy group-containing vinyl monomer, publicly known and conventional vinyl monomers such as (meth)acrylic acid, crotonic acid, and esters thereof can be used. These vinyl monomers may be used alone, or two or more kinds of them may be used in combination.

Examples of the ester of the (meth)acrylic acid include (meth)acrylic acid alkyl ester such as methyl (meth)acrylate, ethyl (meth)acrylate, n-propyl (meth)acrylate, isopropyl (meth)acrylate, n-butyl (meth)acrylate, isobutyl (meth) acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth) acrylate, lauryl (meth)acrylate, or stearyl stearyl, benzyl (meth)acrylate, phenyl (meth)acrylate, phenoxyethyl (meth) acrylate, tetrahydrofurfuryl (meth)acrylate, or various alkylcarbitol (meth)acrylates such as ethylcarbitol (meth) acrylate, and isobornyl (meth)acrylate, dicyclopentanyl (meth)acrylate, dicyclopentenyl (meth)acrylate, or dicyclopentenyloxyethyl (meth)acrylate; hydroxyl group-containing (meth)acrylates such as 2-hydroxyethyl (meth) acrylate, 2-hydroxypropyl (meth)acrylate, 3-hydroxypropyl (meth)acrylate, and (4-hydroxybutyl(meth)acrylate; polyethylene glycol mono(meth)acrylate or polypropylene glycol mono (meth)acrylate; and so-called lactone-modified hydroxyl group-containing (meth)acrylates obtained by the ring-opening reaction of various hydroxyl group-containing (meth)acrylates described above with ε-caprolacton.

As the other vinyl monomers, there can be used various hydrolyzable silyl group-containing monomers such as γ-(meth)acryroyloxypropyltrimethoxysilane, γ-(meth) acryroyloxypropyltriethoxysilane and γ-(meth) acryroyloxypropylmethyldimethoxysilane; various fluorine-containing α-olefins such as vinyl fluoride, vinylidene fluoride, trifluoroethylene, tetrafluoroethylene, chlorotrifluoroethylene, bromotrifluoroethylene, pentafluoropropylene, and hexafluoropropylene; various fluorine-containing vinyl-based monomers, for example, perfluoroalkyl perfluoro vinyl ether and (per)fluoroalkyl vinyl ether (provided that an alkyl group has 1 to 18 carbon atoms) such as trifluoromethyl trifluoro vinyl ether, pentafluoroethyl trifluoro vinyl ether, and heptafluoropropyl trifluoro vinyl ether; phosphate ester group-containing vinyl monomers such as mono[(meth)acryroyloxyethyl] phosphate, acidic phosphoric acid (meth)acrylate ester, and phenyl (meth)acryroyloxyethylphosphate; mono- or diesters of various polycarboxy group-containing monomers such as fumaric acid, maleic acid and itaconic acid and monoalkyl alcohol having 1 to 18 carbon atoms; various aromatic vinyl compounds such as styrene, vinyltoluene, α-methylstyrene, and p-tert-butylstyrene; various amino group-containing amide-based vinyl monomers such as (meth)acrylamide, N-methyl(meth)acrylamide, N-ethyl(meth)acrylamide, N-n-propyl(meth)acrylamide, N-iso-propyl(meth)acrylamide, N-n-butyl(meth)acrylamide, N-iso-butyl(meth)acrylamide, N-tert-butyl(meth)acrylamide, N-amyl(meth)acrylamide, N-(meth)acrylamide, N-hexyl(meth)acrylamide, N-heptyl (meth)acrylamide, N-2-ethylhexyl(meth)acrylamide, N,N-dimethyl(meth)acrylamide, N,N-diethyl(meth)acrylamide, N-methylol(meth)acrylamide, N-methoxymethyl(meth) acrylamide, N-ethoxymethyl(meth)acrylamide, N-n-propoxymethyl(meth)acrylamide, N-iso-propoxymethyl (meth)acrylamide, N-n-butoxymethyl(meth)acrylamide, N-iso-butoxymethyl(meth)acrylamide, N-tert-butoxymethyl (meth)acrylamide, N-amyloxymethylacrylamide, N-hexyloxy(meth)acrylamide, N-heptyloxymethyl(meth) acrylamide, N-octyloxymethyl(meth)acrylamide, N-2-ethylhexyloxymethyl(meth)acrylamide, and diacetone (meth)acrylamide; various dialkylaminoalkyl (meth) acrylates such as dimethylaminoethyl (meth)acrylate, and diethylaminoethyl (meth)acrylate; various nitrogen-containing monomers such as tert-butylaminoethyl (meth) acrylate, tert-butylaminopropyl (meth)acrylate, aziridinylethyl (meth)acrylate, pyrrolidinylethyl (meth)acrylate, piperidinylethyl (meth)acrylate, (meth)acryloyl morpholine, N-vinyl-2-pyrrolidone, N-vinylcaprolactam, N-vinyloxazoline, and (meth)acrylonitrile; various aliphatic vinyl carboxylates such as vinyl acetate, vinyl propionate, vinyl butyrate, vinyl isobutyrate, vinyl caproate, vinyl caprylate, vinyl caprate, vinyl laurate, $C_9$ branched aliphatic vinyl carboxylate, $C_{10}$ branched aliphatic vinyl carboxylate, $C_{11}$ branched aliphatic vinyl carboxylate, and vinyl stearate; various vinyl esters of carboxylic acid, which have a cyclic structure, such as vinylcyclohexane carboxylate, vinylmethylcyclohexane carboxylate, vinyl benzoate, and vinyl p-tert-butylbenzoate; various alkyl vinyl ethers such as ethyl vinyl ether, hydroxyethyl vinyl ether, hydroxy-n-butyl vinyl ether, hydroxyisobutyl vinyl ether, cyclohexyl vinyl ether, and lauryl vinyl ether; various halogenated olefins other than fluorine-containing α-olefins described above, such as vinyl chloride and vinylidene chloride; and various α-olefins such as ethylene, propylene, and butene-1.

As the radical polymerization initiator, for example, there can be used various azo compounds such as 2,2'-azobisisobutylonitrile, 2,2'-azobismethylbutylonitrile, 2,2'-azobis-2,4-dimethylvaleronitrile, 1,1'-azobiscyclohexanecarbonitrile, dimethyl-2,2'-azobisisobutyrate, 4,4'-azobis-4-cyanovaleric acid, 2,2'-azobis(2-amidinopropene) dihydrochloride, 2-tert-butylazo-2-cyanopropane, 2,2'-azobis(2-methylpropionamide) dihydrate, 2,2'-azobis[2-(2-imidazolin-2-yl)propene], and 2,2'-azobis(2,2,4-trimethylpentane); and various ketone peroxides; peroxyketals, hydroperoxides; dialkyl peroxides, diacyl peroxides, peroxyesters; peroxydicarbonates and hydrogen peroxide, such as benzoyl peroxide, methyl ethyl ketone peroxide, cumene hydroperoxide, potassium persulfate, tert-butylperoxy neodecanoate, tert-butylperoxy pivalate, tert-butylperoxy-2-ethyl hexanoate, tert-butylperoxy isobutyrate, 1,1-bis-tert-butylperoxy-3,3,5-trimethylcyclohexane, tert-butylperoxy laurate, tert-butylperoxy isophthalate, tert-butylperoxy acetate, tert-butylperoxy benzoate, dicumyl peroxide, and di-tert-butyl peroxide.

The organic solvents used in the preparation of the epoxy group-containing vinyl copolymer (A) are publicly known conventional organic solvents.

Examples of the organic solvent include alkyl alcohols such as methanol, ethanol, n-propanol, isopropanol, n-butanol, isobutanol, sec-butanol, tert-butanol, n-pentanol, and isopentanol; glycol ethers such as methylcellosolve, ethylcellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, and propylene glycol diethyl ether; aromatic hydrocarbons such as benzene, toluene, xylene, and ethylbenzene; mixed hydrocarbons containing an aromatic hydrocarbon such as Exxon Aromatic Naphtha No. 2 (manufactured by Exxon Corp., USA); aliphatic hydrocarbons such as n-pentane, n-hexane, and n-octane; mixed hydrocarbons containing an aliphatic hydrocarbon, such as Isoper C, Isoper E, Exxol DSP100/140, Exxol D30 (manufactured by Exxon Corp.), IP Solvent 1016 (manufactured by Idemitsu Petrochemical Co., Ltd.); alicyclic hydrocarbons such as cyclopentane, cyclohexane, methylcyclohexane, and ethylcyclohexane; ethers such as tetrahydrofuran, dioxane, diisopropyl ether, and di-n-butyl ether; ketones such as acetone, methyl ethyl ketone, and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate, and butyl propionate.

If necessary, a chain transfer agent can be used. Examples thereof include dodecylmercaptane, laurylmercaptane, thioglycolate ester, mercapto ethanol, and α-methylstyrene dimer.

The epoxy group-containing vinyl copolymer (A) used in the present invention has a glass transition temperature of 40° C. or higher, but this glass transition temperature is preferably within a range from 50 to 90° C., and more preferably from 60 to 80° C., so as to ensure excellent storage stability of the powder coating composition and excellent smoothness of the coating film. When the glass transition temperature is 40° C. or lower, the storage stability of the resulting powder coating composition is likely to become poor and, therefore, it is not preferred.

The number-average molecular weight of the epoxy group-containing vinyl copolymer (A) having a glass transition temperature of 40° C. or higher is preferably within a range from 1,000 to 2,500, and preferably from 1,500 to 2,200, so as to ensure excellent smoothness and scratch resistance of the coating film when formed into a thin film.

The epoxy equivalent in the epoxy group-containing vinyl copolymer (A) is preferably within a range from about 250 to 450, and more preferably from 300 to 400.

Next, the epoxy group-containing vinyl copolymer (B) having a glass transition temperature of 0° C. or lower, 30 to 90% by weight of a polymerization unit constituting the copolymer originating in a methacrylic acid alkyl ester (b-1) which has an alkyl group having 8 or more carbon atoms, used in the present invention, will be described.

The epoxy group-containing vinyl copolymer (B) can be prepared by using an epoxy group-containing vinyl monomer and a methacrylic acid alkyl ester (b-1) which has an alkyl group having 8 or more carbon atoms as an essential constituent component and, if necessary, other vinyl monomers, and polymerizing these monomers in an organic solvent.

In that case, as the epoxy group-containing vinyl monomer and other vinyl monomers, there can be used various vinyl monomers described as those which can be used to prepare the epoxy group-containing vinyl copolymer (A) having a glass transition temperature of 40° C. or higher. The methacrylic acid alkyl ester (b-1) which has an alkyl group having 8 or more carbon atoms can be used in the amount within a range from 30 to 90% by weight, and preferably from 40 to 80% by weight, based on the total amount of vinyl monomers.

When the amount of the methacrylic acid alkyl ester (b-1) which has an alkyl group having 8 or more carbon atoms is within the above range, a remarkable effect of improving the humidity resistance and water resistance of the coating film obtained by using the powder coating composition of the present invention is exerted and the effect of improving the smoothness and scratch resistance of the coating film is also exerted when formed into a thin film.

As the methacrylic acid alkyl ester (b-1) which has an alkyl group having 8 or more carbon atoms, those which have an alkyl group having 8 or more carbon atoms can be used, among methacrylic acid alkyl esters. Examples thereof include 2-ethylhexyl methacryate, n-octyl methacryate, isooctyl methacryate, 2-ethyloctyl methacryate, n-decyl methacryate, isodecyl methacryate, lauryl methacryate, stearyl methacryate, eicosyl methacryate, and tetraeicosyl methacryate.

These methacrylic acid alkyl esters (b-1) which have an alkyl group having 8 or more carbon atoms can be used alone, or two or more kinds of them can be used in combination. Among these, the methacrylic acid alkyl esters (b-1) which has an alkyl group having 8 or more carbon atoms, those which have an alkyl group having 12 or more carbon atoms, for example, lauryl methacryate and stearyl methacryate, are more preferred.

As the radical polymerization initiator, the organic solvent and the chain transfer agent, there can be used compounds described as those which can be used in the preparation of the epoxy group-containing vinyl copolymer (A) described above.

The epoxy group-containing vinyl copolymer (B) used in the present invention has a glass transition temperature of 0° C. or lower, but this glass transition temperature is preferably within a range from −5 to −60° C., and more preferably from −10 to −50° C., so as to ensure excellent scratch resistance and smoothness of the coating film. When the glass transition temperature is 0° C. or higher, the scratching resistance of the resulting coating film is likely to become poor and, therefore, it is not preferred.

The epoxy equivalent of the epoxy group-containing vinyl copolymer (B) is preferably 1,500 or less, and preferably 800 or less, so as to maintain for a long term the excellent properties of the coating film obtained by using the powder coating composition of the present invention, for example, humidity resistance, water resistance, and scratch resistance.

From the same point of view, the number-average molecular weight of the epoxy group-containing vinyl copolymer (B) is preferably within a range from about 2,000 to 20,000, and preferably from 4,000 to 15,000.

The amount of the epoxy group-containing vinyl copolymer (B) is within a range from about 0.1 to 10% by weight, more preferably from 0.5 to 5% by weight, and most preferably from 1 to 4% by weight, based on the component (A). It is preferred that the epoxy group-containing vinyl copolymer (A) be not substantially compatible with the epoxy group-containing vinyl copolymer (B) so as to ensure excellent smoothness and scratch resistance of the resulting coating film.

As used herein, the expression "not substantially compatible with" refers to the case in which, when the coating film is formed by mixing the epoxy group-containing vinyl-based copolymer (A) with the epoxy group-containing vinyl copolymer (B) in the amounts described above, and the two are melted by heating, and then the mixtures is cooled, turbidity is observed in the coating film thus obtained. In order to substantially prevent the epoxy group-containing vinyl copolymer (A) from being compatible with the epoxy group-containing vinyl copolymer (B), a difference in SP value between the epoxy group-containing vinyl copolymer (A) and the epoxy group-containing vinyl copolymer (B) is preferably within a range from 1.0 to 4.0 and the epoxy group-containing vinyl-based copolymer (B) preferably has a SP value lower than that of the epoxy group-containing vinyl copolymer (A).

As used herein, the SP value refers to a parameter which represents a polarity of the resin and is determined in the following manner.

After weighing 0.5 g of a sample in a 100 ml Erlenmeyer flask, 10 ml of tetrahydrofuran (THF) is added to thereby dissolve the sample. The resulting solution is maintained at a liquid temperature of 25° C. and then hexane is added dropwise using a 50-ml burette while stirring using a magnetic stirrer. The amount of drops ($V_h$) used until the point at which turbidity occurs (turbidity point) is obtained.

Next, using deionized water in place of hexane, the amount of drops ($V_d$) is obtained at the turbidity point.

The SP value δ of the resin can be determined from $V_h$ and $V_d$ as follows, using the equation shown by SUH, CLARKE (J. Polym. Sci. A-1, Vol. 5, 1671–1681 (1967)).

$$\delta = ((V_{mh})^{(1/2)} \delta_{mh} + (V_{md})^{(1/2)} \delta_{md}) / (V_{mh})^{(1/2)} + (V_{md})^{(1/2)})$$

where $$V_{mh} = (V_h \cdot V_t) / (\phi_h \cdot V_t + \phi_t \cdot V_h),$$

$$V_{md} = (V_d \cdot V_t) / (\phi_d \cdot V_t + \phi_t \cdot V_d),$$

$$\delta_{mh} = \phi_h \cdot \delta_h + \phi_t \cdot \delta_t,$$

$$\delta_{md} = \phi_d \cdot \delta_d + \phi_t \cdot \delta_t,$$

$\phi_h$, $\phi_d$, $\phi_t$; volume fraction of hexane, deionized water and THF at the turbidity point, $$(\phi_h = v_h / (v_h + 10), \phi_d = /(v_d + 10)),$$

$\delta_h$, $\delta_d$, $\delta_t$; SP value of hexane, deionized water and THF, and $V_h$, $V_d$, $V_t$; molecular volume of hexane, deionized water and THF (ml/mol).

Next, the polycarboxylic acid (C) used in the present invention will be described.

As the polycarboxylic acid (C), aliphatic or aromatic polycarboxylic acids can be mainly used. Typical examples thereof include succinic acid, glutaric acid, adipic acid, pimelic acid, suberic acid, azelaic acid, sebacic acid, brasylic acid, dodecanoic diacid, eicosanoic diacid, tetraeicosanoic diacid, maleic acid, citraconic acid, itaconic acid, glutaconic acid, butanetricarboxylic acid, butanetetracarboxylic acid; phthalic acid, isophthalic acid, trimellitic acid, pyromellitic acid, tetrahydrophthalic acid, hexahydrophthalic acid, cyclohexene-1,2-dicarboxylic acid; and acid anhydrides thereof.

Also urethane-modified compounds obtained by reacting the polycarboxylic acids or anhydrides thereof with the polyisocyanate compounds can be used. These polycarboxylic acids (C) may be used alone, or two or more kinds of them can be used in combination. Among these polycarboxylic acids, an aliphatic dibasic acid is preferred because of its excellent physical properties of the coating film and the storage stability, and dodecanoic diacid is particularly preferred because of its excellent physical properties of the coating film.

With respect to a mixing ratio of the epoxy group-containing polyfunctional vinyl-based copolymers (A) and (B) to the polycarboxylic acid (C), an equivalent ratio of epoxy groups in the copolymers (A) and (B) to carboxyl groups in the polycarboxylic acid (C), ((A)+(B))/(C) is preferably within a range from about 0.5 to 2.0, and more preferably within a range from about 0.8 to 1.5.

To the powder coating composition of the present invention, various publicly known and conventional additives for coating composition and pigments, for example, curing catalysts, flow modifiers, antiblocking agents, ultraviolet absorbers, photostabilizers, benzoin, antistatic agents and antioxidants can be added, if necessary, in addition to various synthetic resins such as epoxy resin, polyester resin, urethane resin and polyamide resin.

As the ultraviolet absorber, photostabilizer and antioxidant, among these additives, there can be used various benzophenone-based compounds such as 2,4-dihydroxybenzophenone ("Seasorb 100"), 2,2',4,4'-tetrahydroxybenzophenone, 2-hydroxy-4-methoxybenzophenone("Seasorb 101"), 2,2'-dihydroxy-4,4'-methoxybenzophenone, and 2-hydroxy-4-methoxy-5-sulfobenzophenone; various benzotriazole-based compounds such as 2-(3,5-di-tert-amyl-2-hydroxyphenyl) benzotriazole ("Tinuvin 328"), 2-(2'-hydroxy-5'-methylphenyl)benzotriazole ("Tinuvin P"), and 2-[2-hydroxy-3,5-di(1,1-dimethylbenzyl)phenyl]-2H-benzotriazole ("Tinuvin 900"); various salicylate-based compounds such as phenylsalicylate ("Seasorb 201"); various substituted-acrylonitrile-based compounds such as ethyl-2-cyano-3,3'-diphenylacrylate ("Seasorb 501"); various anilide oxalate-based compound such as 2-ethoxy-2'-ethyloxalic acid bisanilide ("Tinuvin 312"); various nickel complex-based compounds such as [2,2'-thiobis(4-tert-octylphenolate)]-2-ethylhexylamine-nickel (II) ("Seasorb 612NH"); various hindered amine-based compounds such as bis(1,2,2,6,6,-pentamethyl-4-piperidyl) sebacate ("Tinuvin 292"), bis(2,2,6,6,-tetramethyl-4-piperidyl) sebacate ("Tinuvin 770"), 2-(3,5-di-tert-butyl-4-hydroxybenzyl)-2-n-butylmalonic acid bis(1,2,2,6-pentamethyl-4-piperidyl) ("Tinuvin 144"); and various phenol-based compounds such as 3,5-di-tert-butyl-4-hydroxytoluene ("BHT Swanox"), tetrakis-[methylene-(3,5-di-tert-butyl-4-hydroxyhydrocinnamate)] ("Irganox 1010").

As the curing catalyst, for example, phosphines such as triphenylphosphine, imidazoles such as 2-methylimidazole, and ammonium salts such as tetrabutylammonium chloride can be used.

As the pigment, there can be used various inorganic pigments such as titanium oxide, red iron oxide, chrome titanium yellow, yellow iron oxide, and carbon black; various publicly known and conventional organic pigments and extenders, for example, phthalocyanine-based pigments such as phthalocyanine blue or phthalocyanine green, anthraquinone-based pigments such as indanthrene blue or dianthraquinonyl red, quinacridone-based pigment, azo-based pigment such as lake red, fast yellow, disazo yellow or permanent red, nitro-based pigment such as naphthol yellow, and nitroso-based pigment such as pigment green B or naphthol green; and various publicly known and conventional (brilliant) metallic pigments such as aluminum flakes and mica flakes.

Most preferably, the powder coating composition of the present invention is prepared by a so-called melt-kneading method in view of good quality stability and stable mass production. That is, the desired powder coating composition can be obtained by mixing the above-described respective raw materials and sufficiently melt-kneading the mixture using a melt kneader such as heat roller or extruder at a temperature of about 50 to 130° C., followed by cooling, grinding, and further classification.

Next, the coating film forming method using the powder coating composition of the present invention will be described.

The powder coating composition of the present invention can be used to coat various base materials using a publicly known and conventional method such as electrostatic spraying or fluidized dipping method, and a coating film made of the powder coating composition can be obtained by baking the resulting coated article at a temperature of about 120 to 250° C.

The powder coating composition of the present invention can be preferably used as a topcoat coating composition when forming a single- or multi-layered coating film on an article to be coated. In particular, it can be used more preferably as the topcoat coating composition (II) when the base coat coating composition (I) is applied on the article to be coated and topcoat coating composition (II) is further applied on the coating film and is then cured to obtain a coated article. When the base coat coating composition (I) is a colored base coat coating composition, the topcoat coating composition (II) is preferably a transparent topcoat coating composition.

The base coat coating composition (I) refers to a coating composition which is applied directly on various base materials described hereinafter, or applied on a coating film made of an under coat coating composition or an intermediate coating composition formed on the base material, and has a function of imparting color hue and design characteristic such as an attractive appearance to the base material and also imparting adhesion between the topcoat coating composition (II) to be applied thereon and the surface preparation.

Also the topcoat coating composition (II) refers to a coating composition which is applied on the coating film coated with this base coat coating composition (I) is applied, and has a function of protecting a coating film made of the base coat coating composition (I) and imparting gloss.

The articles to be coated refer to base materials coated with a coating composition, and are specifically non-coated metallic materials such as non-coated steel sheet, or untreated or chemically-treated aluminum base materials, and examples thereof include base materials used in vehicle bodies such as automobile bodies or two wheeled vehicle bodies, and base materials used in automobile parts such as aluminum wheels. Also there are base materials used in vehicle bodies such as automobile body subjected to electrodeposition coating. Furthermore, there are base materials used in appliances, automatic vending machines and furniture made of steels, for examples, zinc electroplated steel sheet, galvanized steel sheet, tiles, glasses, various inorganic building materials, various building materials such as doors of gates or fences, and various interior and exterior building materials such as aluminum sash.

These base materials may be in the final form for use, or may be in a form in which a PCM (precoat metal) coating method is applied, that is, a plate-like cut plate base material which is folded into a predetermined shape according to the purposes after forming a multi-layered coating film by the method of the present invention. The base material may also be a base material used in a coating system which is completely subjected to post-forming such as coil coating.

If necessary, those obtained by forming a coating film made of an intermediate coating composition on the base material can also be used preferably as the article to be coated.

The intermediate coating composition refers to a coating composition which is applied on the base material to improve the smoothness, chipping resistance, and interlayer adhesion of the multi-layered coating film finally obtained. The intermediate coating composition comprises various main agent components such as alkyd resin, polyester resin, acrylic resin and epoxy resin, and a curing agent component such as amino resin or polyisocyanate compound, and may be of an organic solvent type, non-water-dispersible type, powder type, water-soluble type or water-dispersible type, and of heat curable or cold curable type.

As the base coat coating composition (I), a publicly known water-based coating composition or solvent-based coating composition can be used. Examples of the water-based coating composition, which can be used as the base coat coating composition, include (1) those containing a water-based resin as a binder, (2) those containing a dispersion (water-dispersible) type resin as a binder, and (3) those containing an emulsion polymer as a binder.

Examples of the coating composition (1) include those containing, as a binder, a water-soluble resin obtained by neutralizing an acid group-containing acrylic resin, which is prepared by copolymerizing a vinyl monomer having a carboxyl group, with an amine. Examples of the coating composition (2) include those containing, as a binder, a water-dispersible polyurethane resin having an anion forming group (disclosed in Japanese Patent Application, Second Publication No. 3-45755). Examples of the coating composition (3) include those made of an aqueous emulsion polymer (disclosed in Japanese Patent Application, First Publication No. 56-157358) solution containing fine crosslinking polymer particles.

Examples of the solvent-based coating composition, which can be used as the base coat coating composition, include a coating composition using an organic solvent solution of a polymer soluble in an organic solvent such as toluene or xylene, such as vinyl resin having hydroxyl groups in combination with aminoplast, polyisocyanates or block polyisocyanates capable of reacting with hydroxyl groups in the vinyl copolymer.

Among these coating compositions, water-based and solvent-based coating compositions using a vinyl copolymer having hydroxyl groups in combination with aminoplast, polyisocyanates, or block polyisocyanates capable of reacting with hydroxyl groups in the vinyl copolymer are preferred. Among these coating compositions, a coating composition using a vinyl copolymer having hydroxyl groups in combination with aminoplast is particularly preferred because of its excellent effect of improving the adhesion to the article to be coated.

These base coat coating compositions (I) can contain various publicly known pigments such as organic pigments, inorganic pigments, extenders, and brilliant (metallic) pigments, and additives such as curing accelerators and leveling agent.

As the topcoat coating composition (II) which is applied on the coating film coated with the base coat coating composition (I) is applied, the powder coating composition of the present invention can be preferably used. By using the powder coating composition of the present invention, it is made possible to obtain a coating film which is superior in smoothness, sharpness and scratch resistance, and is also superior in water resistance and humidity resistance.

As the topcoat coating composition (II) in the present invention, an opaque coat coating composition can also be used. Particularly, when the base coat coating composition (I) is a colored base coat coating, a transparent topcoat coating composition is preferably used because it does not impair an attractive appearance of the coating film. The transparent topcoat coating composition may be a colored coating composition as far as it is transparent.

As described above, the powder coating composition of the present invention can provide a coating film having excellent smoothness, scratch resistance, water resistance, and humidity resistance when applied on various articles to be coated, followed by baking and further drying, even when formed into a thin film.

EXAMPLES

The present invention will be described in more detail by way of Reference Examples, Examples and Comparative Examples. In the following Reference Examples, Examples and Comparative Examples, parts are by weight unless otherwise specified.

Reference Example 1
(Preparation of Epoxy Group-containing Vinyl-based Copolymer (A))

In a reaction vessel equipped with a thermometer, a stirrer, a reflux condenser and a nitrogen introducing inlet, 100 parts of xylene were charged and heated to 130° C.

To the xylene, a mixture of 45 parts of glycidylmethacrylate, 5 parts of n-butylmethacrylate, 35 parts of methyl methacrylate and 15 parts of styrene as monomers and 8.0 parts of tert-butylperoxy-2-ethyl hexanoate as a polymerization initiator was added dropwise over 5 hours.

After the completion of the dropwise addition, the polymerization reaction was continued while maintaining at the same temperature for 10 hours, and then completed to obtain a solution (A'-1) of an epoxy group-containing vinyl-based copolymer (A-1). Furthermore, xylene was removed by maintaining 30 parts of the resulting copolymer solution (A'-1) under reduced pressure of about 20 Torr to obtain an epoxy group-containing vinyl-based copolymer (A-1). The property values of the epoxy group-containing vinyl-based copolymer (A-1) and its solution (A'-1) is shown in Table 1.

Reference Example 2
(Preparation of Epoxy Group-containing Vinyl-based Copolymer (A))

In the same manner as in Reference Example 1, except that the mixture was replaced by a mixture of monomers and a polymerization initiator shown in Table 1, a solution (A'-2) of the objective epoxy group-containing vinyl copolymer (A-2) was obtained. Furthermore, xylene was removed by maintaining 30 parts of the resulting copolymer solution (A'-2) under reduced pressure of about 20 Torr to obtain an epoxy group-containing vinyl-based copolymer (A-2). Property values of the epoxy group-containing vinyl-based copolymer (A-2) and its solution (A'-2) are shown in Table 1.

Reference Example 3
(Preparation of Epoxy Group-containing Vinyl-based Copolymer (A) for Comparison)

In the same manner as in Reference Example 1, except that the mixture was replaced by a mixture of monomers and a polymerization initiator shown in Table 1, a solution (A'-3) of the objective epoxy group-containing vinyl copolymer (A-3) was obtained. Furthermore, xylene was removed by maintaining 30 parts of the resulting copolymer solution (A'-3) under reduced pressure of about 20 Torr to obtain an epoxy group-containing vinyl-based copolymer (A-3) Property values of the epoxy group-containing vinyl-based copolymer (A-3) and its solution (A'-3) are shown in Table 1.

TABLE 1

|  |  | Epoxy group-containing vinyl copolymer (A) | | |
|---|---|---|---|---|
|  |  | Reference Example 1 A-1 | Reference Example 2 A-2 | Reference Example 3 A-3 |
| Monomer | Styrene | 15 | 15 | 15 |
|  | Methyl methacrylate | 35 | 25 | 35 |

TABLE 1-continued

|  |  | Epoxy group-containing vinyl copolymer (A) | | |
|---|---|---|---|---|
|  |  | Reference Example 1 A-1 | Reference Example 2 A-2 | Reference Example 3 A-3 |
|  | n-butyl methacrylate | 5 | 20 | 5 |
|  | Glycidyl methacrylate | 45 | 40 | 45 |
| Polymerization initiator | tert-butylperoxy-2-ethyl hexanoate | 8.0 | 5.0 | 6.5 |
| Property values of copolymer (A) | Glass transition temperature (° C.) | 70 | 60 | 70 |
|  | Number-average molecular weight | 2,000 | 2,400 | 3,000 |
|  | Epoxy equivalent | 340 | 375 | 335 |
|  | SP value | 10.35 | 10.18 | 10.39 |
| Property values of copolymer solution (A') | Nonvolatile content (%) | 51.0 | 51.5 | 51.8 |

(Glass Transition Temperature (° C.))

Numerical value determined by converting the temperature (° K) calculated by Fox's equation to the temperature (° C.)

$$100/Tg = W1/Tg1 + W2/Tg2 + W3/Tg3 + W4/Tg4 \ldots$$

where $W1, W2, \ldots$ each denotes a mass fraction (% by weight),
and $Tg1, Tg2, \ldots$ each denotes a glass transition temperature (° K) of a homopolymer of the respective components (as the glass transition temperature of the homopolymer, the value described in Polymer Handbook (Second Edition, edited by J, Brandrup E, H, Immergut) was used)

(Number-average Molecular Weight)

Number-average molecular weight determined by measuring the molecular weight of a tetrahydrofuran soluble component by gel permeation chromatography (Epoxy Equivalent)

Value measured by the hydrochloric acid-pyridine method (SP Value)

Value determined by the method described in detail in "embodiments of the present invention" of the present specification.

Reference Example 4

(Preparation of Epoxy Group-containing Vinyl-based Copolymer (B))

In a reaction vessel equipped with a thermometer, a stirrer, a reflux condenser and a nitrogen introducing inlet, 100 parts of xylene was charged and heated to 120° C.

To xylene, a mixture of monomers and a polymerization initiator shown in Table 2 was added dropwise over 4 hours. After the completion of the dropwise addition, the polymerization reaction was continued while maintaining at the same temperature for 10 hours, and then completed to obtain a solution (B'-1) of an epoxy group-containing vinyl-based copolymer (B-1).

Furthermore, xylene was removed by maintaining 30 parts of the resulting copolymer solution (B'-1) under reduced pressure of about 20 Torr to obtain an epoxy group-containing vinyl-based copolymer (B-1). The property values of the epoxy group-containing vinyl-based copolymer (B-1) and its solution (B'-1) is shown in Table 2.

Reference Examples 5 and 6

(Preparation of Epoxy Group-containing Vinyl-based Copolymer (B))

In the same manner as in Reference Example 4, except that the mixture was replaced by each mixture of monomers and a polymerization initiator shown in Table 2, solutions (B'-2) and (B'-3) of the objective epoxy group-containing vinyl copolymers (B-2) and (B-3) were obtained. Furthermore, xylene was removed by maintaining 30 parts of each copolymer solution (B') under reduced pressure of about 20 Torr to obtain epoxy group-containing vinyl-based copolymers (B-2) and (B-3). Property values of the respective epoxy group-containing vinyl-based copolymers (B) and their solutions (B') are shown in Table 2.

Reference Example 7

(Preparation of Epoxy Group-containing Vinyl-based Copolymer (B-4) for Comparison)

In the same manner as in Reference Example 4, except that the mixture was replaced by a mixture of monomers and a polymerization initiator shown in Table 2, a solution (B'-4) of an epoxy group-containing vinyl copolymer (B-4) for comparison was obtained. Furthermore, xylene was removed by maintaining 30 parts of the resulting copolymer solution (B'-4) under reduced pressure of about 20 Torr to obtain an epoxy group-containing vinyl-based copolymer (B-4). Property values of the epoxy group-containing vinyl-based copolymer (B-4) and its solution (B'-4) are shown in Table 2.

TABLE 2(1)

|  |  | Epoxy group-containing vinyl copolymer (B) | | | |
|---|---|---|---|---|---|
|  |  | Reference Example 4 B-1 | Reference Example 5 B-2 | Reference Example 6 B-3 | Reference Example 7 B-4 |
| Monomer | Methyl methacrylate | 5 |  |  |  |
|  | n-butyl methacrylate | 25 | 30 |  |  |
|  | 2-ethylhexylacrylate |  |  | 20 | 56 |

TABLE 2(1)-continued

| | | Epoxy group-containing vinyl copolymer (B) | | | |
|---|---|---|---|---|---|
| | | Reference Example 4 B-1 | Reference Example 5 B-2 | Reference Example 6 B-3 | Reference Example 7 B-4 |
| | Glycidyl methacrylate | 15 | 30 | 40 | 44 |
| Methacrylic acid alkyl ester (b-1) which has an alkyl group having 8 or more carbon atoms | 2-ethylhexylmethacrylate "Acryester SL" Stearyl methacrylate | 15 40 | 40 | 40 | |
| Polymerization initiator | tert-butylperoxy-2-ethyl hexanoate | 0.2 | 0.7 | 0.5 | 0.5 |

TABLE 2(2)

| | | Epoxy group-containing vinyl copolymer (B) | | | |
|---|---|---|---|---|---|
| | | Reference Example 4 B-1 | Reference Example 5 B-2 | Reference Example 6 B-3 | Reference Example 7 B-4 |
| Property values of copolymer (B) | Glass transition temperature (° C.) | −42 | −16 | −33 | −31 |
| | Number-average molecular weight | 9,400 | 6,700 | 7,300 | 7,100 |
| | Epoxy equivalent | 950 | 480 | 360 | 330 |
| | Amount (% by weight) of methacrylic acid alkyl ester (b-1) which has an alkyl group having 8 or more carbon atoms | 55 | 40 | 40 | 0 |
| | SP value | 8.53 | 8.91 | 8.75 | 8.92 |
| Property value of copolymer solution (B') | Nonvolatile content (%) | 50.0 | 49.8 | 50.1 | 50.1 |

(Note)
"Acryester SL": trade name of a mixture of a methacrylic acid alkyl ester having a $C_{12}$ alkyl group on the side chain and a methacrylic acid alkyl ester having a $C_{13}$ alkyl group on the side chain, manufactured by Mitsubishi Rayon Co., Ltd.

Reference Examples 8 to 12

(Preparation Examples of Mixtures (S) of Epoxy Group-containing Vinyl Copolymers (A) and Epoxy Group-containing Vinyl-based Copolymers (B))

According to the formulation shown in Table 3, the solutions (A'-1) and (A'-2) of the epoxy group-containing vinyl-based copolymers (A) obtained in Reference Example 1 and 2 and the solutions (B'-1) to (B'-3) of the epoxy group-containing vinyl-based copolymers (B) obtained in Reference Examples 4 to 6 were charged in a vessel and were mixed by stirring, and then xylene was removed by maintaining the mixture under reduced pressure of about 20 Torr to obtain mixtures (S-1) to (S-5) each having a non-volatile content of 99.5% or more.

Reference Example 13

(Preparation Example of Mixture (S-6) of Epoxy Group-containing Vinyl Copolymer (A-3) and Epoxy Group-containing Vinyl-based Copolymer (B))

According to the formulation shown in Table 3, the epoxy group-containing vinyl-based copolymer solution (A'-3) obtained in Reference Example 3 and the epoxy group-containing vinyl-based copolymer solution (B'-1) obtained in Reference Example 4 were charged in a vessel and were mixed by stirring, and then xylene was removed by maintaining the mixture under reduced pressure of about 20 Torr to obtain a mixture (S-6) having a nonvolatile content of 99.8%.

Reference Example 14

(Preparation Example of Mixture (S-7) of Epoxy Group-containing Vinyl Copolymer (A) and Epoxy Group-containing Vinyl-based Copolymer (B-4) for Comparison)

According to the formulation shown in Table 3, the epoxy group-containing vinyl-based copolymer solution (A'-1) obtained in Reference Example 1 and the epoxy group-containing vinyl-based copolymer solution (B'-4) obtained in Reference Example 7 were charged in a vessel and were mixed by stirring, and then xylene was removed by maintaining the mixture under reduced pressure of about 20 Torr to obtain a mixture (S-7) having a nonvolatile content of 99.8%.

Reference Example 15

(Preparation Example of Mixture (S-8) of Epoxy Group-containing Vinyl Copolymer (A) and Epoxy Group-containing Vinyl-based Copolymer (B-4) for Comparison)

According to the formulation shown in Table 3, the epoxy group-containing vinyl-based copolymer solution (A'-2) obtained in Reference Example 2 and the epoxy group-containing vinyl-based copolymer solution (B'-4) obtained in Reference Example 7 were used in the same manner as in Reference Example 14, a mixture (S-8) having a nonvolatile content of 99.7% was obtained.

TABLE 3(1)

| | Mixture (S) of epoxy group-containing vinyl copolymer (A) and epoxy group-containing vinyl copolymer (B) | | | |
|---|---|---|---|---|
| | Reference Example 8 S-1 | Reference Example 9 S-2 | Reference Example 10 S-3 | Reference Example 11 S-4 |
| Epoxy group-containing vinyl copolymer solution (A') | | | | |
| A'-1 | 98 | 97 | | |
| A'-2 | | | 99 | 98 |
| A'-3 | | | | |
| Epoxy group-containing vinyl copolymer solution (B') | | | | |
| B'-1 | 2 | | | 2 |
| B'-2 | | 3 | | |
| B'-3 | | | 1 | |
| Mixing ratio, (B)/(A), of copolymer (A) to copolymer (B) | 2/98 | 3/97 | 1/99 | 2/98 |
| Difference, (A)–(B), in SP value between copolymer (A) and copolymer (B) | 1.82 | 1.44 | 1.43 | 1.65 |

TABLE 3(2)

| | Mixture (S) of epoxy group-containing vinyl copolymer (A) and epoxy group-containing vinyl copolymer (B) | | | |
|---|---|---|---|---|
| | Reference Example 12 S-5 | Reference Example 13 S-6 | Reference Example 14 S-7 | Reference Example 15 S-8 |
| Epoxy group-containing vinyl copolymer solution (A') | | | | |
| A'-1 | | | 98 | |
| A'-2 | 97 | | | 97 |
| A'-3 | | 98 | | |
| Epoxy group-containing vinyl copolymer solution (B') | | | | |
| B'-1 | | 2 | | |
| B'-2 | 3 | | | |
| B'-3 | | | | |
| B'-4 | | | 2 | 3 |
| Mixing ratio, (B)/(A), of copolymer (A) to copolymer (B) | 3/97 | 2/98 | 2/98 | 3/97 |
| Difference, (A)–(B), in SP value between copolymer (A) and copolymer (B) | 1.27 | 1.86 | 1.43 | 1.26 |

Examples 1 to 6
(Preparation Example of Powder Coating Compositions of the Present Invention)

According to the formulation shown in Table 4, the respective components were mixed in a "Henschel mixer" (a mixer, manufactured by MITSUI MIIKE MACHINERY Co., Ltd.) and the mixture was kneaded with heating using "MP-2015" (a twin-screw extruding kneader, manufactured by APV Chemical Machinery, USA).

The resulting various kneaded mixtures were cooled, ground, and then classified to prepare various desired powder coating compositions (X-1) to (X-5) each having an average particle diameter of 15 to 35 μm.

Comparative Reference Example 1

In the same manner as in Example 1, except that the mixture (S-6) obtained in Reference Example 13 was used in place of the mixture (S-1) of the epoxy group-containing vinyl-based copolymer (A) and the epoxy group-containing vinyl copolymer (B) obtained in Reference Example 8, a powder coating composition (X-6) for comparison was prepared.

Comparative Reference Example 2

In the same manner as in Example 1, except that the mixture (S-7) obtained in Reference Example 14 was used in place of the mixture (S-1) of the epoxy group-containing vinyl-based copolymer (A) and the epoxy group-containing vinyl copolymer (B) obtained in Reference Example 8, a powder coating composition (X-7) for comparison was prepared.

Comparative Reference Example 3

In the same manner as in Example 5, except that the mixture (S-8) obtained in Reference Example 15 was used in place of the mixture (S-5) of the epoxy group-containing vinyl-based copolymer (A) and the epoxy group-containing vinyl copolymer (B) obtained in Reference Example 12, a powder coating composition (X-8) for comparison was prepared.

TABLE 4(1)

| | Example 1 | Example 2 | Example 3 | Example 4 |
|---|---|---|---|---|
| Powder coating composition | X-1 | X-2 | X-3 | X-4 |
| Mixture (S) of epoxy group-containing vinyl copolymer (A) and epoxy group-containing vinyl copolymer (B) | | | | |
| S-1 | 100 | | | |
| S-2 | | 100 | | |
| S-3 | | | 100 | |
| S-4 | | | | 100 |
| Curing agent (C) | | | | |
| Dodecanoic diacid | 33 | 33 | 30 | 30 |
| Additive | | | | |
| Benzoin | 0.5 | 0.5 | 0.5 | 0.5 |
| "Troy EX-570" | 1.0 | 1.0 | 1.0 | 1.0 | of this mixed solution and 500 parts of methyl ethyl ketone (MEK) were charged and, after maintaining with stirring under nitrogen-sealing at 75° C. for 30 minutes, the remaining mixed solution was added dropwise over 2 hours.

Furthermore, the reaction was continued at the same temperature for 12 hours to obtain an acrylic resin solution having a nonvolatile content of 50%, a solution acid value of 20, a solution hydroxyl value of 25, and a Gardner Viscosity at 25° C. of Z (the same as in the case described hereinafter).

To 1000 parts of this acrylic resin solution, 31 parts of dimethylaminoethanol was added, and after removing the solvent, the solution was conditioned by adding water to obtain a water-soluble acrylic resin solution having a nonvolatile content of 55%. Hereinafter, this product is abbreviated to a water-soluble resin (E-1).

Reference Example 17
(Preparation Example of Water-dispersible Resin Used in Coating Film Forming Method of the Present Invention)

In the same manner as in Reference Example 16, except that the acrylic monomer component used was replaced by the following, a stable milk-white dispersion having a solid content of 45% of a water-dispersible acrylic resin containing crosslinkable fine particles insoluble in the solvent was obtained. Hereinafter, this product is abbreviated as water-dispersible resin (E-2).

(Acrylic Monomer Component Used)
Methyl methacrylate: 450 parts
Ethyl acrylate: 350 parts
2-hydroxyethyl methacrylate: 150 parts
Acrylic acid: 20 parts
Ethylene glycol dimethacrylate: 30 parts
n-octylmercaptane: 5 parts

TABLE 4(2)

| | Example 5 | Comparative Reference Example 1 | Comparative Reference Example 2 | Comparative Reference Example 3 |
|---|---|---|---|---|
| Powder coating composition | X-5 | X-6 | X-7 | X-8 |
| Mixture (S) of epoxy group-containing vinyl copolymer (A) and epoxy group-containing vinyl copolymer (B) | | | | |
| S-1 | 100 | | | |
| S-2 | | 100 | | |
| S-3 | | | 100 | |
| S-4 | | | | 100 |
| Curing agent (C) | | | | |
| Dodecanoic diacid | 33 | 33 | 30 | 30 |
| Additive | | | | |
| Benzoin | 0.5 | 0.5 | 0.5 | 0.5 |
| "Troy EX-570" | 1.0 | 1.0 | 1.0 | 1.0 |
| Pigment | | | | |
| "CR-90" | 56 | | | 56 |

"CR-90": rutile type titanium "TIPAQUE CR-90", manufactured by Ishihara Sangyo, Ltd.

Reference Example 16
(Preparation Example of Water-soluble Resin Used in Coating Film Forming Method of the Present Invention)

Previously, a mixed solution of 250 parts of styrene, 157 parts of methyl methacrylate, 63 parts of 2-hydroxyethyl methacrylate, 30 parts of methacrylic acid and 8 parts of tert-butylperoxy octate (abbreviated to TBPO) is prepared.

In a reaction vessel equipped with a thermometer, a stirrer, a reflux condenser and a nitrogen introducing inlet, 75 parts Ammonium persulfate: 4 parts
"Triton X-200": 15 parts
"Emulgen 840s": 10 parts
deionized water: 530 parts
"Triton X-200": trade name of anionic surfactant, manufactured by Rohm & Haas, USA
"Emulgen 840s": trade name of nonionic surfactant, manufactured by Kao Atlas Co., Ltd.

Reference Example 18
(Preparation Example of Thickener)

To 64 parts of "Acrysol ASE-60" (trade name of thickener, manufactured by Rohm & Haas, solid content=28%), 6 parts of dimethylethanolamine and deionized water were added to obtain the desired thickener having a solid content of 3%. This product is abbreviated as (P).

Reference Example 19
(Preparation Example (1) of Water-based Base Coat Coating Composition)

100 Parts of the water-soluble resin (E-1) obtained in Reference Example 16, 10 parts of the thickener (P) obtained in Reference Example 18, 6 parts of "Cymel 300" (aforementioned), 1.0 parts of p-toluenesulfonic acid, 3 parts of "Aluminum Paste Dispersion #4919" (trade name of aluminum paste, manufactured by TOYO ALUMINIUM K.K.), 1.5 parts of "Aluminum Paste Dispersion #55-519" (manufactured by TOYO ALUMINIUM K.K.) and 12 parts of isopropanol were mixed, and then the viscosity as measured at 20° C., with a No. 4 Ford cup, was adjusted to 16 seconds. Hereinafter, this product is abbreviated as water based base coat coating composition (I-1).

Reference Example 20
(Preparation Example (2) of Water-based Base Coat Coating Composition)

100 parts of the water-dispersible resin (E-2) obtained in Reference Example 17, 10 parts of the thickener (P) obtained in Reference Example 18, 5 parts of "Cymel 300", 1.0 parts of p-toluenesulfonic acid, 3 parts of "Aluminum Paste Dispersion # 4919", 1.5 parts of "Aluminum Paste Dispersion #55-519" and 12 parts of isopropanol were mixed, and then the viscosity as measured at 20° C., with a No. 4 Ford cup, was adjusted to 16 seconds. Hereinafter, this product is abbreviated as water based base coat coating composition (I-2).

Examples 6 and 7

Each of the powder coating compositions (X-1) and (X-5) obtained in Examples 1 and 5 was applied on a 0.8 mm thick satin-finished steel sheet subjected to a zinc phosphating treatment using an electrostatic spray coater for powder coating, and was then baked at 160° C. for 20 minutes to obtain various test sheets each having a cured coating film formed thereon. The evaluation results of these coating films are summarized in Table 5.

Comparative Examples 1 to 3

In the same manner as in Examples 6 and 7, except that powder coating compositions described above were replaced by the powder coating compositions for comparison (X-6), (X-7) and (X-8) obtained in Comparative Reference Example 1 to 3, various test sheets each having a cured coating film formed thereon were obtained. The evaluation results of these coating films are summarized in Table 5.

TABLE 5

| Powder coating composition | Example 6 X-1 | Example 7 X-5 | Comparative Example 1 X-6 | Comparative Example 2 X-7 | Comparative Example 3 X-8 |
|---|---|---|---|---|---|
| Thickness ($\mu$m) | 46 | 48 | 45 | 47 | 48 |
| Smoothness | 5 | 4 | 2 | 4 | 4 |
| Gloss of coating film (60 degree gloss) | 94 | 87 | 87 | 91 | 85 |
| Scratch resistance | 4 | 4 | 4 | 4 | 4 |
| water resistance | 4 | 4 | 4 | 1 | 2 |
| Humidity resistance | 5 | 5 | 5 | 2 | 2 |

Procedure for Evaluation of Physical Properties of Coating Film

Thickness: measured by an electromagnetic thickness meter.
Smoothness: visually evaluated according to the following five-level criteria.
Rating "5": very smooth coated surface
Rating "4": small roundness present
Rating "3": large roundness present
Rating "2": large roundness present with considerable orange peel surface
Rating "1": large roundness present with severe orange peel surface, which severely damages the appearance of the coating film
Scratch resistance: cleanser resistance was examined. After impregnating a flannel cloth with a 5% cleanser-water dispersion, the coating film was rubbed by moving the flannel cloth back and forth 50 times. Then, 20 degree gloss (20 degree mirror reflectance coefficient in %) before and after rubbing was measured. The scratch resistance was evaluated by so-called gloss retention (%) according to the following five-level criteria.
Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%
Water resistance: a coated sheet was dipped in hot water at 40° C. for 20 days, and 20 degree gloss (20 degree mirror reflectance coefficient in %) was measured after 30 minutes had passed since the completion of removing the coating sheet. The water resistance was evaluated by the gloss retention (%) determined from the gloss value before and after the test according to the following five-level criteria.
Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%
Humidity resistance: a coated sheet was allowed to stand under the conditions of a temperature of 40° C. and a relative humidity of 100% for 20 days, and 20 degree gloss (20 degree mirror reflectance coefficient in %) was measured. The humidity resistance was evaluated by the gloss retention (%) determined from the gloss value before and after the test according to the following five-level criteria.
Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%

Example 8

Using the powder coating composition (X-1) obtained in Example 1, two-coat one-bake coating was conducted according to so-called multi-layered coating film forming method to form a coating film and various performances were evaluated. As a base material to be coated, those subjected to the following pre-treatment were used.

Specifically, the base material used is a base material obtained by treating a soft steel sheet with "Bondelight #3030" (trade name of a zinc phosphate treating agent, manufactured by Nippon Parkerizing Co., Ltd.), applying an epoxy resin-based cationic electrodeposition coating composition thereon, using an electrodeposition coating method, and applying an amino polyester resin-based intermediate coating composition thereon.

The water-based metallic coating composition (I-1) obtained in Reference Example 19 was applied by two portions under a coating atmosphere of a temperature of 25° C. and a relative humidity of 65 to 70% so that the dry film thickness became 20 μm.

Between two coating operations, setting was conducted for 2 minutes. In the case of the first coating operation, an air pressure of a spray gun was set to 5 Kg/cm² and a flow rate of the coating composition was set to 400 m/minute. In the case of the second coating, the flow rate of the coating composition was set to 200 m/minute and the distance between the spray gun and the base material to be coated was set to 40 cm.

Furthermore, the base material to be coated was maintained in such a way that the coating surface of the base material to be coated is always vertical.

After two coating operations, the base material was air-dried at a temperature of 30° C. for 5 minutes. After cooling to room temperature, the powder coating composition (X-1) was applied using an electrostatic spray coater or powder coating and this coated sheet was baked at 140° C. for 20 minutes to obtain a test sheet having a cured coating film formed thereon. The evaluation results of the coating film are shown in Table 6.

Examples 9 to 11

In the same manner as in Example 8, except that the powder coating composition and the water-based metallic coating composition used were replaced by those shown in Table 6, test sheets having a cured coating film formed thereon were obtained. The evaluation results of the coating film are summarized in Table 6.

Comparative Examples 4 and 5

In the same manner as in Example 8, except that the powder coating compositions (X-6) and (X-7) prepared in Comparative Reference Examples 1 and 2 were used, test sheets having a cured coating film formed thereon were obtained. The evaluation results of the coating film are shown in Table 6.

TABLE 6(1)

|  | Example 8 | Example 9 | Example 10 |
|---|---|---|---|
| Powder coating composition | X-1 | X-2 | X-3 |
| Name of water based base coat coating | (I-1) | (I-1) | (I-2) |
| Thickness (μm) of topcoat | 45 | 46 | 45 |
| Smoothness of coating film | 5 | 5 | 5 |
| Gloss of coating film (60 degree gloss) | 94 | 92 | 93 |
| Scratch resistance | 4 | 5 | 5 |
| Water resistance | 5 | 5 | 4 |
| Humidity resistance | 5 | 5 | 4 |

TABLE 6(2)

|  | Example 11 | Comparative Example 4 | Comparative Example 5 |
|---|---|---|---|
| Powder coating composition | X-4 | X-6 | X-7 |
| Name of water based base coat coating | (I-2) | (I-1) | (I-2) |
| Thickness (μm) of topcoat | 44 | 43 | 44 |
| Smoothness of coating film | 5 | 2 | 4 |
| Gloss of coating film (60 degree gloss) | 94 | 87 | 90 |
| Scratch resistance | 4 | 4 | 4 |
| Water resistance | 5 | 5 | 2 |
| Humidity resistance | 5 | 5 | 1 |

Procedure for Evaluation of Physical Properties of Coating Film
Thickness: measured by an electromagnetic thickness meter.
Smoothness: visually evaluated according to the following five-level criteria.
Rating "5": very smooth coated surface
Rating "4": small roundness present
Rating "3": large roundness present
Rating "2": large roundness present with considerable orange peel surface
Rating "1": large roundness present with severe orange peel surface, which severely damages the appearance of the coating film
Scratch resistance: cleanser resistance was examined. After impregnating a flannel cloth with a 5% cleanser-water dispersion, the coating film was rubbed by moving the flannel cloth back and forth 50 times. Then, 20 degree gloss (20 degree mirror reflectance coefficient in %) before and after rubbing was measured. The scratch resistance was evaluated by so-called gloss retention (%) according to the following five-level criteria.
Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%
Water resistance: a coated sheet was dipped in hot water at 40° C. for 20 days, and 20 degree gloss (20 degree mirror reflectance coefficient in %) was measured after 30 minutes had passed since the completion of taking up the coating sheet. The water resistance was evaluated by the gloss retention (%) determined from the gloss value before and after the test according to the following five-level criteria.

Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%
Humidity resistance: a coated sheet was allowed to stand under the conditions of a temperature of 40° C. and a relative humidity of 100% for 20 days, and 20 degree gloss (20 degree mirror reflectance coefficient in %) was measured. The humidity resistance was evaluated by the gloss retention (%) determined from the gloss value before and after the test according to the following five-level criteria.
Rating "5": gloss retention of 90% or more
Rating "4": gloss retention of 80% or more and less than 90%
Rating "3": gloss retention of 65% or more and less than 80%
Rating "2": gloss retention of 50% or more and less than 65%
Rating "1": gloss retention of less than 50%

What is claimed is:

1. A powder coating composition comprising an epoxy group-containing vinyl copolymer (A) having a glass transition temperature of 40° C. or higher and a number-average molecular weight of 1,000 to 2,500, an epoxy group-containing vinyl copolymer (B) having a glass transition temperature of 0° C. or lower, and a polycarboxylic acid (C), wherein 30 to 90% by weight of a polymerization unit constituting the epoxy group-containing vinyl copolymer (B) originates in a methacrylic acid alkyl ester (b-1) which has an alkyl group having 8 or more carbon atoms.

2. The powder coating composition according to claim 1, wherein the epoxy group-containing vinyl copolymer (B) has an epoxy equivalent of 800 or less.

3. The powder coating composition according to claim 1, wherein the epoxy group-containing vinyl copolymer (B) has a SP value smaller than that of the epoxy group-containing vinyl copolymer (A) and a difference in SP value between the epoxy group-containing vinyl copolymer (A) and the epoxy group-containing vinyl copolymer (B) is from 1.0 to 4.0.

4. The powder coating composition according to claim 1, wherein the epoxy group-containing vinyl copolymer (B) has a SP value smaller than that of the epoxy group-containing vinyl copolymer (A) and a difference in SP value between the epoxy group-containing vinyl copolymer (A) and the epoxy group-containing vinyl co-polymer (B) is from 1.27 to 4.0.

5. The powder coating composition according to claim 1, wherein 40 to 80% by weight of a polymerization unit constituting the epoxy group-containing vinyl copolymer (B) originates in a methacrylic acid alkyl ester (b-1) which has an alkyl group having 8 or more carbon atoms.

* * * * *